United States Patent [19]

Klemann et al.

[11] Patent Number: 4,963,386

[45] Date of Patent: Oct. 16, 1990

[54] COMPLEX LINKED ESTER LOW CALORIE FAT MIMETICS

[75] Inventors: Lawrence P. Klemann, Somerville; John W. Finley, Whippany, both of N.J.

[73] Assignee: Nabisco Brands, Inc., East Hanover, N.J.

[21] Appl. No.: 411,913

[22] Filed: Sep. 25, 1989

Related U.S. Application Data

[63] Continuation-in-part of Ser. No. 365,745, Jun. 13, 1989, abandoned, which is a continuation of Ser. No. 144,962, Jan. 19, 1988, abandoned.

[51] Int. Cl.$^5$ .................. A23D 7/00; A23D 9/00; A23D 3/00
[52] U.S. Cl. .................. 426/611; 426/601; 426/612; 426/804; 560/199; 560/201
[58] Field of Search .......... 426/549, 564, 580, 601, 426/611, 804, 612; 560/201, 199; 260/410.8, 410.7, 484 R, 484 A

[56] References Cited

U.S. PATENT DOCUMENTS

| | | |
|---|---|---|
| 2,531,801 | 6/1946 | Blake . |
| 2,962,419 | 11/1960 | Minich . |
| 3,227,559 | 1/1966 | Radlove . |
| 3,578,548 | 5/1971 | White . |
| 3,600,186 | 8/1971 | Mattson et al. . |
| 3,846,479 | 11/1974 | Zech . |
| 3,929,870 | 12/1975 | David et al. . |
| 4,169,102 | 9/1979 | Hameyer et al. . |
| 4,209,451 | 6/1980 | Hameyer et al. . |
| 4,508,746 | 4/1985 | Hamm . |
| 4,582,927 | 4/1986 | Fulcher . |

FOREIGN PATENT DOCUMENTS 1106681  8/1981  Canada .

OTHER PUBLICATIONS

Hamm, D. J. Preparation and Evaluation of Trialkoxytricarballylate, Trialkoxycitrate, Trialkoxyglycerylether, Jojoba Oil and Sucrose Polyester as Low Calorie Replacements of Edible Fats and Oils, J. of Food Sci, vol. 49 (1984) pp. 419–426.
Lipids, 2 H. J. Deuel Interscience Publs. Inc., N.Y. 1955, p. 215.
Deuel, H. J., A. L. S. Cheng and M. G. Morehouse, Journal of Nutrition 35 295 (1948).
F. H. Mattson, Journal of Nutrition 69 338 (1959).
Ward, Gros and Fenge, New Fat Products: Glyceride Esters of Adipic Acid JAOCS, vol. 36, p. 667 (1959).
Chemical Abstracts 66956 (1941).
Arch. Biochem 14:117–24 (1947).
Rehberg et al., "Plasticizers from Lactic Esters and Dibasic Acids", Ind. and Eng. Chem., Sep. 1952, vol. 44, No. 9, 2191–2195.
Chemical Abstracts 15118 (1956).
Chemical Abstracts 13926 (1956).
Chemical Abstracts 76097f (1956).

*Primary Examiner*—Marianne Cintins

[57] ABSTRACT

Novel fat mimetic compounds are disclosed to be useful in reduced calorie foods. These compounds, which are here referred to as complex linked esters, consist of linked multi-ester or multi-ester/ether fragments joined by a polycarboxylate. These complex linked esters may be partially broken down in the body to produce digestion residues which are substantially non-digestible themselves and are sufficiently hydrophilic to enable the digestion residues to be incorporated in the normal stool. These fat mimetic compounds are useful as replacement for fats and oils for most food applications. Also disclosed are processes of synthesizing these compounds.

38 Claims, No Drawings

COMPLEX LINKED ESTER LOW CALORIE FAT MIMETICS

BACKGROUND OF THE INVENTION

This is a continuation-in-part application of U.S. patent application Ser. No. 365,745, filed on June 13, 1989, now abandoned which is a continuation application of U.S. patent application Ser. No. 144,962, filed on Jan. 19, 1988, now abandoned.

The present invention relates to edible fat mimetic materials, and especially to new compounds which have a desirable combination of properties and their use in edible compositions.

Obesity is perceived as a common problem in contemporary society. This condition is due, in many people, to a greater intake of calories than are expended. While genetic and behavioral factors play a major role, it is generally agreed that reasonable modifications of the caloric value of foods can be valuable in reaching a more desirable equilibrium weight for an individual predisposed to obesity.

Many foods which provide gustatory satisfaction contain significant fat levels. This can be a problem for individuals drawn to these foods because fat has about twice the caloric density of protein and carbohydrates. It has, in fact, been estimated that fat contributes about 40% of the total calories in the diet. It has long been desired to reduce the available calories of dietary fat without decreasing the appeal or satiety expected of fatty foods. It has been reported that this would offer a convenient and practical method by which obesity could be controlled, ideally without requiring a dieter to restrict total food intake.

Unfortunately, of the materials heretofore suggested as fat replacements, few have all of the desirable attributes of natural triglyceride fats and oils. One approach to lower the caloric value of edible fat has been to decrease the amount of triglyceride that is absorbed in the human system since the usual edible triglyceride fats are almost completely absorbed (see Lipids, Vol. II, H. J. Deuel, Interscience Publishers, Inc., New York 1955, page 215). The absorbability of triglyceride fat could be decreased by altering either the alcohol or the fatty acid portion of the molecule. There have been some experiments that have demonstrated a decrease in absorbability with certain fatty acids; for example, erucic acid (H. J. Deuel, A. L. S. Cheng, and M. G. Morehouse, *Journal of Nutrition*, Vol. 35 (1948), page 295), and stearic acid if present as tristearin (F. H. Mattson, *Journal of Nutrition*, Vol. 69 (1959), page 338). Also, U.S. Pat. No. 2,962,419 to Minich discloses that fatty acid esters which contain a neopentyl nucleus are not digested like normal fats and thus can be used as fat substitutes in food compositions.

Several other patents disclose edible compounds which are not digested or absorbed to the same extent as natural triglycerides. In U.S. Pat. No. 3,579,548, White discloses certain glycerol esters of certain branched carboxylic acids which are said to have these properties. And, in U.S. Pat. No. 3,600,186, Mattson and Volpenhein disclose sugar and sugar alcohol fatty acid esters having at least four fatty acid ester groups. All of these compounds are said to possess physical properties similar to ordinary triglyceride fat, but to be absorbed less readily when eaten. It is, unfortunately, this very attribute which causes undesirable and potentially embarrassing side effects, including the frank anal discharge of the materials.

In a greater departure from conventional glyceride ester chemistry, Canadian Patent No. 1,106,681 to Trost discloses glycerol dialkyl ether compounds which are said to have functional properties similar to those of conventional fats, but which are not absorbed in the digestive tract to any significant degree. Also, Ward, Gros, and Feuge have reported in New Fat Products: Glyceride Esters of Adipic Acid; *JAOCS*, Vol. 36 (1959), page 667, that highly viscous oils formed by reacting two glycerol molecules with a diabasic acid, such as fumaric, succinic, and adipic acids, and then reacting one of the hydroxyl groups of each glycerol moiety with a fatty acid, are useful in the food industry, primarily as lubricants and coatings.

In U.S. Pat. No. 4,508,746, Hamm discloses a low-calorie substitute for at least a portion of the edible oil component in oil-based food compositions which low-calorie substitute is comprised in substantial proportion of at least one low-calorie oil component selected from the group consisting of thermally stable polycarboxylic acids having 2 to 4 carboxylic acid groups esterified with saturated or unsaturated alcohols having straight or branched carbon chains of from 8 to 30 carbon atoms. See also D. J. Hamm, Preparation and Evaluation of Trialkoxytricarballylate, Trialkoxycitrate, Trialkoxyglycerylether, Jojoba Oil, and Sucrose Polyester as Low Calories Replacements of Edible Fats and Oils, *J. of Food Science*, Vol. 49 (1984), pages 419–426.

In another attempt at simulating the natural properties of fat, Fulcher discloses certain diesters in U.S. Pat. No. 4,582,927. These compounds have at least two carboxylate groups joined to a common carbon atom with each of the carboxylate groups containing the residue of a 12 to 18 carbonalkyl, alkenyl, or dienyl alcohol.

One of the main problems in attempting to formulate fat-like compounds that have decreased absorbability and thus low caloric properties is to maintain the desirable and conventional physical properties of edible fat. Thus, to be a practical low calorie fat, a compound must mimic conventional triglyceride fat by affording the same utility in various fat-containing food compositions such as shortening, margarine, cake mixes, and the like, and be useful in frying or baking. Unfortunately, none of the prior attempts has been successful to the degree that commercial products employing them have either been approved for safety or achieved general public acceptance in their featured role.

Among the problems with some non-absorbable fat-like materials is the possibility that they will leach fat-soluble vitamins and minerals from the body and that they function, when used in larger amounts, as purgatives. Many attempts have been made to solve these and related problems; however, a better solution would employ chemistry more compatible with the human digestive process, while providing a significant decrease in caloric density vis-a-vis glyceride fats.

SUMMARY OF THE INVENTION

The present invention provides a new class of fat mimetic compounds, new food compositions which contain them, the process of synthesizing these compounds, and the process of employing these compounds in food compositions. These compounds, which are here referred to as complex linked esters, consist of linked multi-ester or multi-ester/ether fragments joined by a polycarboxylate. These complex linked esters are partially broken down in the body to produce digestion residues which are substantially non-digestible themselves and are sufficiently hydrophilic to enable the digestion residues to be incorporated in the normal stool. These fat mimetic compounds are useful in food applications as partial or complete replacements for most natural or synthetic fats and oils. The fat mimetic compounds can be defined by the following formula:

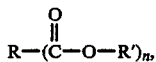

wherein R is a linking covalent bond or saturated or unsaturated aliphatic group; n is 2 to 6; and the R' groups comprise residues defined by the following formula:

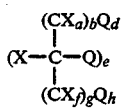

where:
C is a carbon atom;
X is a bridging bonding valence, hydrogen, or substituted or unsubstituted lower aliphatic group (e.g., $C_1$-$C_4$), the various X groups being the same or different;

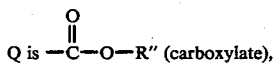

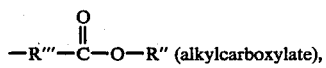

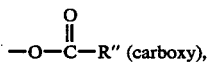

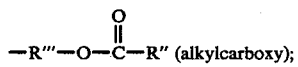

—O—R" (alkoxy), or —R'''—O—R" (alkylalkoxy) radicals; with the proviso that at least one of the Q radicals be other than carboxy;
R" is a substituted or unsubstituted aliphatic group, containing, for example, no more than 30 carbons, e.g.,

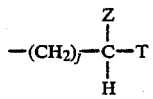

the various R' and R" groups, respectively, being the same or different;
R''' is a lower alkylene, desireably methylene or ethylene, preferably methylene, group which can be the same or different;
T is hydrogen or a substituted or unsubstituted aliphatic group, e.g., no greater than 22 carbons, containing 0 to 5 unsaturated linkages (e.g., C=C double bonds, C≡C triple bonds) per T residue;
Z is a bridging bonding valence, hydrogen, or an alcohol, glycol, ester, e.g.,

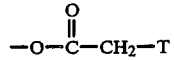

ether, or the like, residue;
with the proviso that there is only one bridging bonding valence per R' group;
and where:
a=0 to 3, preferably 0 to 2;
b=0 to 4, preferably 0 to 1;
d=1 or 2;
e=0 to 5, preferably 1 to 2;
f=0 to 3, preferably 0 to 2;
g=0 to 4, preferably 0 to 1;
h=1 or 2;
j=0 to 10, preferably 0 to 3.

Preferably, each R' group will contain from 2 to 3, most desirably 2, Q radicals.

The compounds are employed in any edible material or any food preparation process where a fat or oil (i.e., triglyceride fat) is normally employed, in total or partial replacement.

By judicious selection of the structural type, molecular size and the number of acid residues, it is possible to achieve a target reduction in calories while preferably achieving the maximum advantage from the combination of the properties of these mimetics.

DETAILED DESCRIPTION

The following description relates to a new class of fat mimetic compounds and their incorporation into any food composition or use in conjunction with any edible material. The term "edible material" is broad and includes anything edible, whether or not intended for nutrition, e.g., it can be an additive such as an antioxidant for fats or oils, an antispatter agent, an emulsifier, or other minor functional ingredient. Thus, chewing gum, flavored coatings, oils and fats intended only for frying, and the like are included. In these, all or a portion of the usual fat is replaced by a compound of the invention.

Representative of edible materials which can contain the fat mimetic compounds of the invention in full or partial replacement of natural fat are: frozen deserts, e.g., sherbet, ice cream, ices, or milk shakes; puddings and pie fillings; margarine substitutes or blends; flavored bread or biscuit spreads; mayonnaise; salad dressing, both emulsified and non-emulsified; filled dairy products such as filled cream or filled milk; dairy or non-dairy cheese spreads; peanut butter; egg substitutes; coffee lighteners, liquid and dried; flavored dips; frying fats and oils; reformed and comminuted meats; meat substitutes or extenders; whipped toppings; compound coatings; frostings and fillings; cocoa butter replacements or blends; candy, especially fatty candies such as containing peanut butter or chocolate; chewing gum; bakery products, e.g., cakes, breads, rolls, pastries, cookies, biscuits, savory crackers; mixes or ingredient premixes for any of these; as well as flavor, nutrient, drug or functional additive delivery systems.

The fat mimetics of the invention can be employed in margarine substitutes which can be either soft or hard. Margarines are generally sold as one of two principal types: namely, (1) print, hard or stick margarine and (2) soft or tub margarine. All of these products contain liquid and hard stock components which can be replaced by fat mimetics of the invention. It is an advantage of the present invention that, by eliminating some or all of the hard stock of conventional margarines, higher ratios of polyunsaturated to saturated fatty acids and lesser amounts of trans isomers can be achieved in high quality margarine products.

The fat mimetic compounds of the invention will be referred to as "complex linked esters" and can be defined by the following general formula:

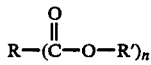

wherein the R is a linking covalent bond or saturated or unsaturated aliphatic group; preferably with up to 10 carbons, most preferably 1 to 6; n is 2 to 6, and preferably 2 to 4; and the R' groups comprise residues defined by the following formula:

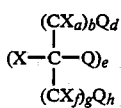

where:
C is a carbon atom;
X is a bridging bonding valence, hydrogen, or substituted or unsubstituted lower aliphatic group (e.g., $C_1$–$C_4$), the various X groups being the same or different;

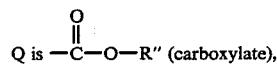

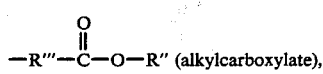

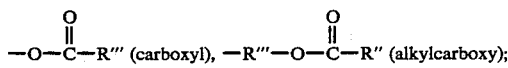

—O—R" (alkoxy), or —R'"—O—R" (alkylalkoxy) radicals, with the proviso that at least one of the Q radicals be other than carboxy;

R" is substituted or unsubstituted aliphatic group, containing, for example, no more than 30 carbons, e.g.,

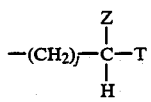

the various R' and R" groups, respectively, being the same or different;

R'" is lower alkylene, desirably methylene or ethylene, preferably methylene, group which can be the same or different;

T is hydrogen or a substituted or unsubstituted aliphatic group, e.g., no greater than 22 carbons, containing 0 to 5 unsaturated linkages (e.g., C=C double bonds, C≡C triple bonds) per T residue;

Z is a bridging bonding valence, hydrogen, or an alcohol, glycol, ester, e.g.,

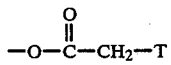

ether, or the like, residue;
with the proviso that there is only one bridging bonding valence per R' group;
and where:
a=0 to 3, preferably 0 to 2;
b=0 to 4, preferably 0 to 1;
d=1 or 2;
e=0 to 5, preferably 1 to 2;
f=0 to 3, preferably 0 to 2;
g=0 to 4, preferably 0 to 1;
h=1 or 2;
j=0 to 10, preferably 0 to 3.

Preferably, each R' group will contain from 2 to 3, most desirably 2, Q radicals.

Where Q groups are carboxy or alkylcarboxy, they can be fatty acid residues which are preferably derived from natural fat. The more readily digestible carboxylic acid residues can be a highly desirable essential acid or a nutritionally advantageous carboxylic acid such as: oleic, linoleic, linolenic, eicosapentaenoic acids, as well as low molecular weight carboxylic acids (e.g., acetic, propionic, butyric acids). Also suitable are other fatty acids having from about 8 to 22 carbon atoms. Examples of such fatty acids are caprylic, capric, lauric, myristic, myristoleic, palmitic, palmitoleic, stearic, ricinoleic, eleostearic, arachidic, behenic, and erucic. The fatty acids can be derived from suitable naturally-occurring or synthetic fatty acids and can be saturated or unsaturated, including positional and geometric isomers, depending on the desired physical properties, e.g., liquid or solid, of the fat compound.

Fatty acids per se or naturally-occurring fats and oils can serve as the source for the fatty acid component in the complex linked ester. For example, rapeseed oil provides a good source for $C_{22}$ fatty acids. $C_{16}$–$C_{18}$ fatty acids can be provided by tallow, soybean oil, or cottonseed oil. Shorter chain fatty acids can be provided by coconut, palm kernel, or babassu oils. Corn oil, lard, olive oil, palm oil, peanut oil, safflower seed oil, sesame seed oil, and sunflower seed oil, are examples of other natural oils which can serve as the source of the fatty acid component. Among the fatty acids, those that are more usually preferred have from about 14 to about 18 carbon atoms, and are most preferably selected from the group consisting of myristic, palmitic, stearic, oleic, and linoleic. Thus, natural fats and oils which have a high content of these fatty acids represent preferred sources for the fatty acid components, e.g., soybean oil, olive oil, cottonseed oil, corn oil, tallow, and lard.

Where the Q groups are carboxylate, alkylcarboxylate, alkoxy, or alkylalkoxy, they can be residues of alcohols having saturated or unsaturated aliphatic groups (i.e., R") with 1 to 30 carbons. The preferred alcohols are fatty (e.g., oleyl, linoleyl, linolenyl, stearyl, palmityl, myristyl, lauryl, capryl, eicosapentaenyl, and the like). The preferred fatty alcohols are of similar chain lengths and configurations to those of the preferred fatty acids.

The particular types of fatty acids and alcohols can be selected to achieve the desired texture (both solid and liquid) and melt characteristics in the compound. Blends of complex linked esters with each other and/or with natural fats and oils and/or other fat mimetic materials such as sucrose polyesters can be selected for a desired rheology, melt profile, and mouthfeel. This is especially desirable in the case of margarine substitutes, cookie fillings, whipped toppings, etc.

Among the carboxy/carboxylate/alkoxy esters preferred for many applications are those with melting points below about 98° F., because these materials melt completely in the mouth, providing the organoleptic sensation of natural fats and oils. For some products, relatively sharp melting points, say in the range of from about 90° to 98° F., are desired because they provide a cooling sensation and a meltdown equivalent to high quality, solid, natural fats.

The complex linked esters may be partially broken down in the body to yield digestion residues which, preferably, are each more hydrophilic than the complex ester substrate. The majority by weight of the digestive residues will be non-hydrolyzable by normal digestive processes, while a minor amount by weight may be susceptible to facile cleavage by the action of digestive enzymes. The selection of the exact type of chemical bonds which will provide the desired proportions of hydrolytically reactive versus "inert" sites is determined by experiment.

The complex linked ester fat mimetics of this invention can further be defined by the following more specific formula:

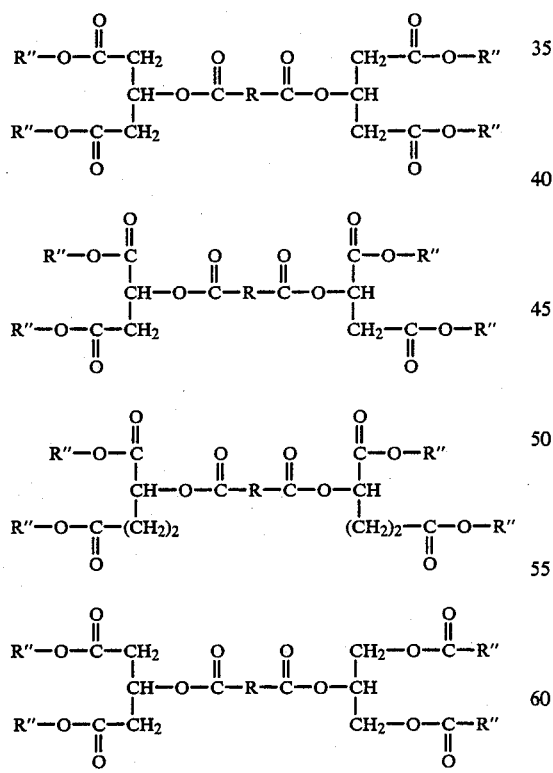

wherein each R and R" is as defined above.

The following is a list of representative, but non-limiting, examples of R' groups which can be linked to form the complex linked esters of the invention:

I. REVERSE ESTER LINKAGES

A. Alkyl Side Chains

_I. Reverse Ester Linkages_
_A. Alkyl Side Chains_

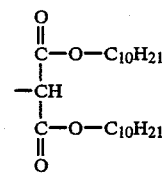 (1)

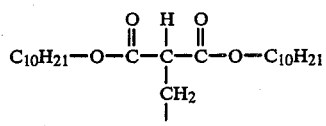 (2)

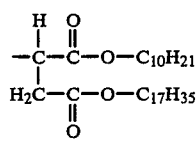 (3)

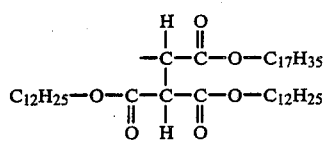 (4)

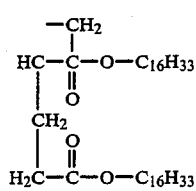 (5)

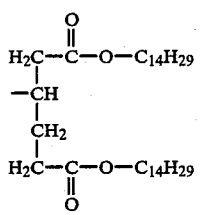 (6)

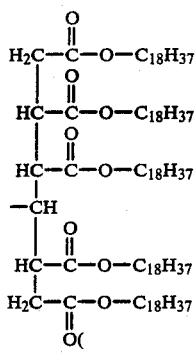 7)

I. Reverse Ester Linkages
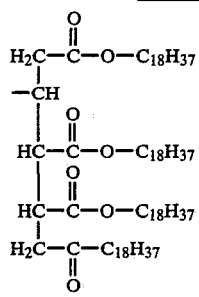
(8)
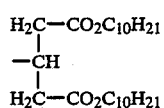
(9)
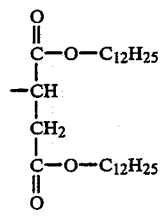
(10)
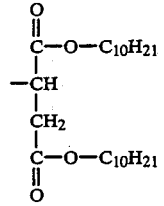
(11)
B. Alkenyl Side Chains
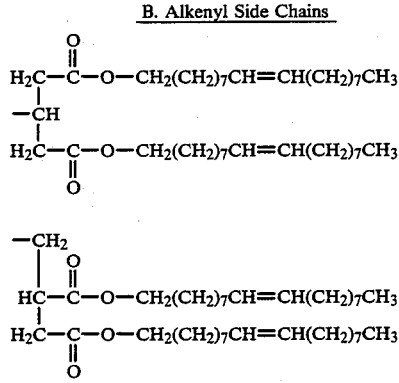
(12)
(13)
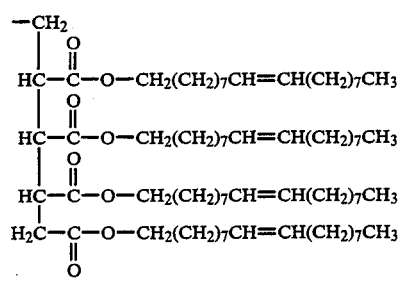
(14)
C. Mixed Alkyl/Alkenyl Side Chains
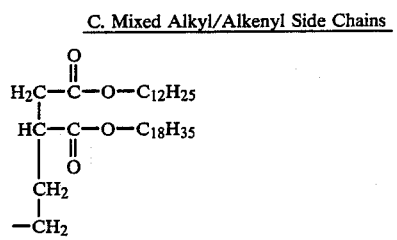
(15)
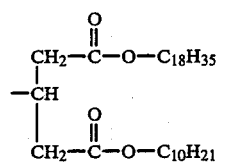
(16)
D. Miscellaneous Side Chains
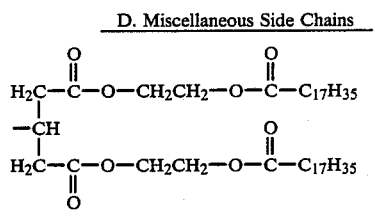
(17)
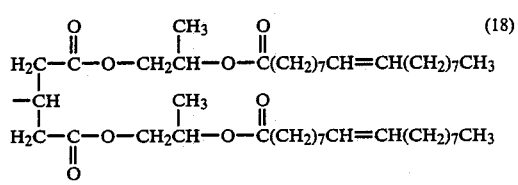
(18)
II. NORMAL ESTER LINKAGES
A. Alkyl Side Chains
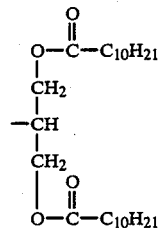
(19)
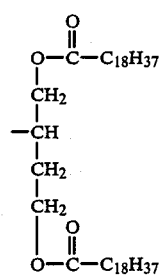
(20)

B. Alkenyl Side Chains
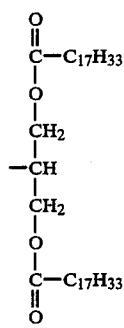
(21)
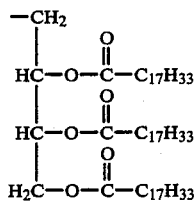
(22)
C. Alkyl/Alkenyl Side Chains
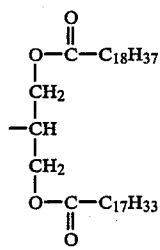
(23)
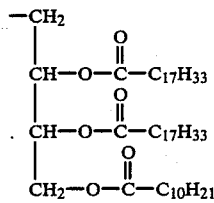
(24)
III. NORMAL ESTER/REVERSE ESTER LINKAGE
A. Alkyl Side Chains
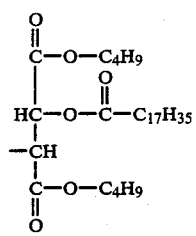
(25)
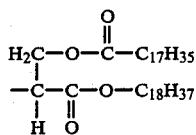
(26)
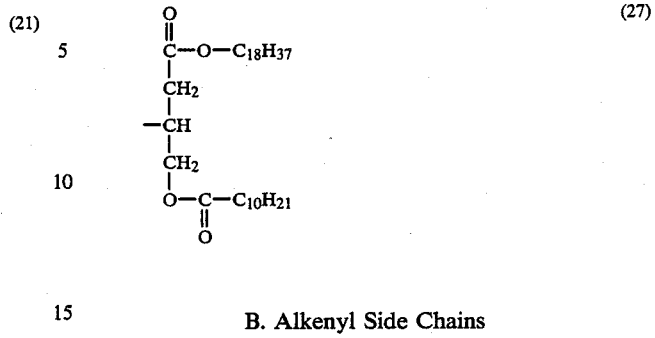
(27)
B. Alkenyl Side Chains
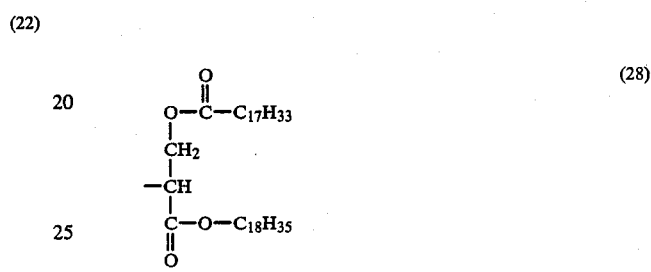
(28)
C. Mixed Alkyl/Alkenyl Side Chains
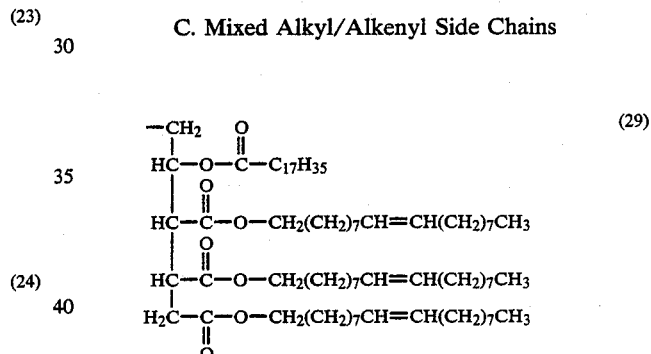
(29)
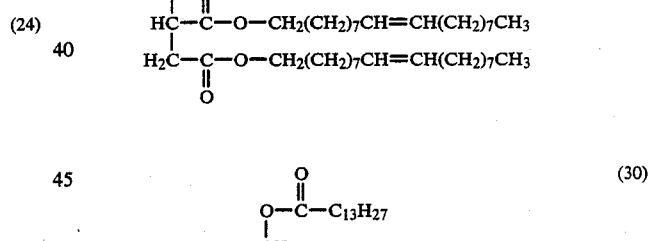
(30)
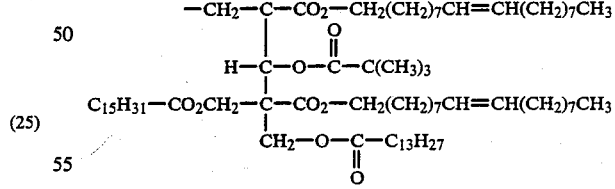
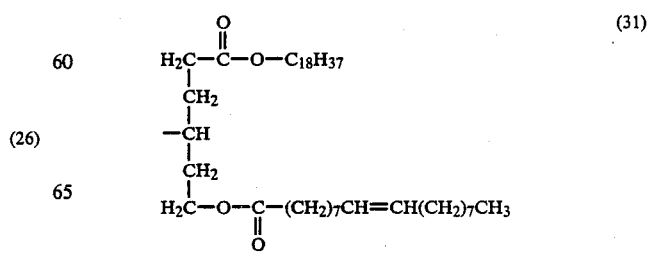
(31)

III. ETHER LINKAGES

A. Ether Linkages Alone

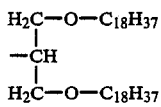 (32)

B. Mixed Ether/Ester Linkages

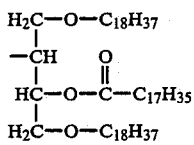 (33)

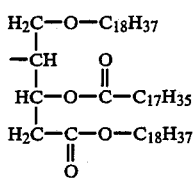 (34)

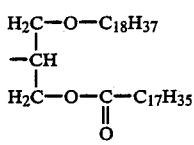 (35)

The preparation of the complex linked esters of the invention involves the reaction of alcohols of the formula R'—OH with a polybasic compound effective to link the R' radicals to a common molecular framework. Among the polybasic compounds are: polybasic acids of the formula

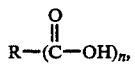

acid chlorides of the formula

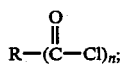

alkyl esters of the formula

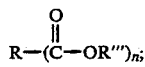

dibasic acid cyclic anhydrides of the formula

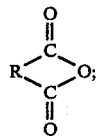

or mixed anhydrides of a dibasic acid such as shown by the formula

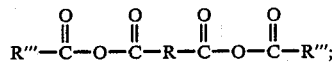

wherein R, R', R''', and n are as defined above. The reactions will typically proceed at approximately ambient or reduced pressure and at temperatures of from about 0° to 190° C. Solvents and/or catalysts may be employed to adjust the reaction rate and product recovery as desired.

Representative dibasic acids are saturated acids such as oxalic, malonic, succinic, glutaric, adipic and unsaturated acids such as maleic, fumaric, citraconic, mesaconic, glutamic, aspartic, sebacic, and suberic. Also, diglycolic acid can be utilized. Representative of tribasic acids are citric, tricarballylic, cis, cis-1,3,5-cyclohexanetricarboxylic, cis-aconitic and trans-aconitic acids. Representative tetrabasic acids are methane tetracarboxylic acid and 1,1,2,2-ethane tetracarboxylic acid. Suitable anhydrous acid chloride, acid bromide, and lower alkyl ester forms of these acids can be employed as desired.

The fat mimetic compounds of the present invention can be synthesized in either of two ways. The synthesis path is selected depending on whether the R' groups on the compound are to be the same or different.

In the first reaction sequence, a fat mimetic compound with the same R' groups is produced. This process involves reacting a hydroxyl-containing base reactant compound of the following formula:

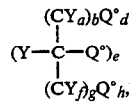

wherein

Y is a hydroxyl, hydrogen, or substituted or unsubstituted lower aliphatic group (e.g., $C_1$–$C_4$), the various Y groups, being the same or different and Q, a, b, d, e, f, g, and h have been previously identified,

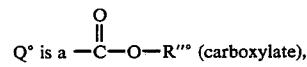

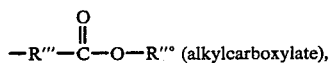

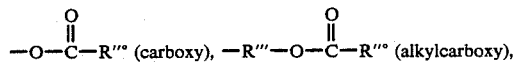

—O—R'''° (alkoxy), or —R'''—O—R'''° (alkylalkoxy radical, with the proviso that at least one of the Q° radicals be other than carboxy;

R'''° is a substituted or unsubstituted aliphatic group, containing, for example, no more than 30 carbons, e.g.,

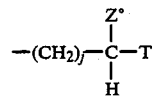

the various R' and R" groups, respectively, being the same or different and

Z° is a hydroxyl, hydrogen, or an alcohol, glycol, ester, ether, or the like, residue, with a substituent reactant compound of either of the following formulae:

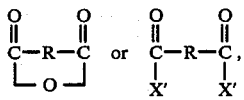

wherein

X' is a halogen element or a hydroxyl group and R has been previously defined, under conditions at which a fat mimetic compound of the formula:

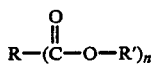

will form. Typically, such conditions are at temperatures of 130°–190° C. and at a vacuum of 100–300 Torr.

In some cases, the reaction between the base reactant compound and the substituent reactant is preceded by a series of steps which increase the size of the R' groups. Firstly, a starting compound defined by the formula:

$$\begin{array}{c}(CW_a)_bQ'_d\\|\\(W-C-Q')_e\\|\\(CW_f)_gQ'_h\end{array}$$

wherein

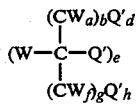

$-R'''-\overset{O}{\underset{\|}{C}}-O-R°$ (alkylcarboxylate), $-O-\overset{O}{\underset{\|}{C}}-R°$ (carboxy), $-R'''-O-\overset{O}{\underset{\|}{C}}-R°$ (alkylcarboxy), —O—R° (alkoxy), or —R°—O—R° (alkylalkoxy) radicals, with the proviso that at least one of the Q' radicals be other than carboxy;

R° is a substituted or unsubstituted aliphatic group, containing, for example, no more than three carbons, the various R' and R° groups, respectively, being the same or different; and W is a double bonded oxygen, hydrogen, or substituted or unsubstituted lower aliphatic group (e.g., $C_1-C_4$), the various W groups being the same or different with at least one W group being double bonded oxygen, is reacted with a compound defined by the formula:

R"OH under conditions at which a precursor compound defined by the formula:

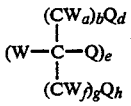

will be formed. Typically, these conditions include: the use of strong acid catalysts, like trichloro acetic acid, trifluoro acetic acid, sulfonated polystyrene solids; temperatures of 130°–190° C.; and a vacuum of 100–300 Torr. Next, the precursor is reacted with an alkali metal borohydride under conditions at which the substituent reactant compound will form and any double bonded oxygen groups in said precursor compound will be converted to hydroxyl groups in said substituent reactant compound.

By utilizing this first synthesis path, a variety of compounds can be produced from a variety of others. In one example, the base reactant compound is adipoyl chloride, and the substituent reactant compound is dioleyl 3-hydroxyglutarate. In another example, the base reactant compound is glutaric anhydride, and the substituent reactant compound is dioleyl 2-methyl-2-hydroxymethylmalonate. In yet another example, the base reactant compound is sebacoyl chloride, and the substituent reactant compound is dioleyl 2-hydroxysuccinate. In all these examples, the substituent reactant reacts with the base reactant in a 1:2 ratio to form a fat mimetic compound with the same R' groups. If a higher ratio is sought (i.e., if n is to be greater than 2) substituent reactant compounds with more reactive sites must be selected. For example, dimethyl malonate can be reacted with 1,6-dibromohexane to form an intermediate compound of the formula:

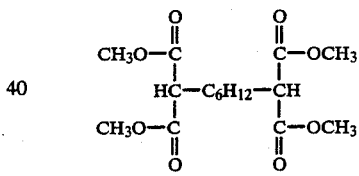

The intermediate compound is then reacted with didecyl propane-2-ol-1,3-dicarboxylate to form the compound of the following formula where n equals 4:

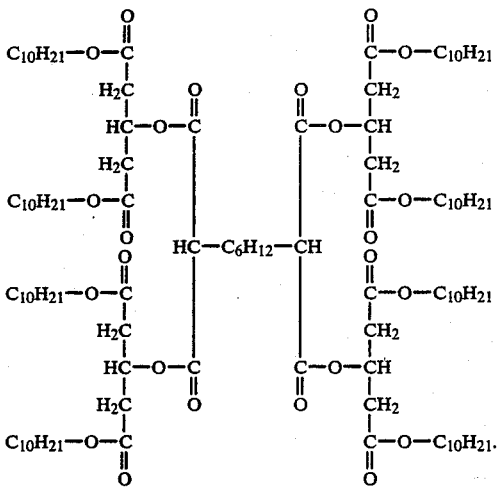

By utilizing a second synthesis path, fat mimetic compounds in accordance with the present invention can be prepared with different R' groups. The first step of this synthesis involves partially reacting the base compound defined in the discussion of the first synthesis with the previously-identified substituent reactant compound under conditions at which a first intermediate compound defined by the formula:

$$R-(C(=O)-O-R')_{n-1}(C(=O)-OH)$$

is formed. Typically, such conditions are at temperatures of 130°–190° C. and at a vacuum of 100–300 Torr.

Comparing the first and second synthesis paths, it is apparent that in the first path, the base reactant compound and the substituent reactant compound react in a 1:2 ratio, while they react in a 1:1 ratio in the second path. The lesser extent of reaction by the second synthesis as compared with the first is achieved by utilizing in the second synthesis path half the amount of base reactant compound as in the first synthesis. Alternatively and preferably, however, a substituent compound with reactive sites having different specific levels of reactivity can be utilized to achieve a 1:1 reaction ratio with the base reactant compound.

The next step of the second synthesis involves reacting the first intermediate compound with a compound of the formula:

$$SOX'_2$$

under conditions at which a second intermediate compound defined by the formula:

$$R-(C(=O)-O-R')_{n-1}(C(=O)-X')$$

is formed. This reaction is carried out at room temperature and atmospheric pressure. In the last step of the second synthesis path, the second intermediate compound is reacted with the base reactant compound under conditions at which a fat mimetic compound defined by the general formula is formed:

$$R-(C(=O)-O-R')_n.$$

Typically, such conditions are at temperatures of 130°–190° C. and at a vacuum of 100–300 Torr. Although the general formula of this product is the same as that resulting from the first synthesis path, the second synthesis can be used to make products with different R' groups, while the first synthesis path cannot.

Again, the second synthesis path can be used to prepare a wide variety of compounds from a wide variety of other compounds. In one example, the substituent reactant compound is succinic anhydride, the base reactant compound reacting with the substituent reactant compound is dioleyl 3-hydroxyglutarate, the first intermediate compound is mono-(dioleyl glutar-3-yl) succinate, the compound of the formula $SOX'_2$ is thionyl chloride, the second intermediate compound is mono-(dioleyl glutar-3-yl) succinoyl monochloride, and the base reactant compound reacting with the said second intermediate is 1,3-dipalmitoyl glycerol. In this example, a base reactant compound reacts with the substituent reactant compound in a 1:1 ratio, and, subsequently, a different base reactant compound reacts with the second intermediate compound in a 1:1 ratio to form a product fat mimetic compound where n equals 2 and there are two different R' groups.

Once the fat mimetic compounds of the present invention are produced by one of these synthesis paths, they may be refined before being incorporated in a food product. Such refining may include any one or more of the following steps: filtration, clay bleaching, steam deodorization, alkali refining, centrifugation, acid washing, molecular distillation, etc.

The following examples are presented to further illustrate and explain the present invention and should not be taken as limiting in any regard. Unless otherwise indicated, all parts and percentages are by weight.

EXAMPLE 1

This example shows the preparation, from intermediates to final molecular composition, of a fat mimetic material of the invention, having the following structure:

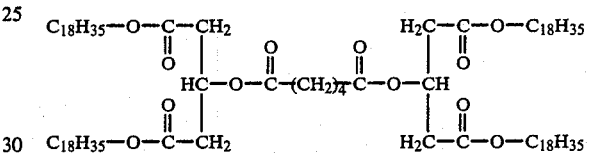

Dioleyl 3-oxyglutarate. Trichloroacetic acid (9.8 g, 0.06 mole), dimethyl 1,3-acetonedicarboxylate (139.3 g, 0.80 mole), and oleyl alcohol (451.1 g, 1.68 mole, 5 mole % excess) are combined in a 2000 mL flask fitted with a distillation head, thermometer, and Teflon coated stirrer bar. The apparatus is evacuated to about 150 mm Hg and is heated at 130° to 140° C. for 17 hours. A quantitative yield of clear orange oil is obtained. An nmr spectrum in deuterochloroform is consistent with the proposed structure; chemical shift in ppm (multiplicity, assignment, relative intensity): 5.35 (apparent triplet, HC=CH, 4 H), 4.13 (triplet, O—CH$_2$—, 4 H), 3.61 (singlet, O=C—CH$_2$—C=O, 4 H), 2.01, 1.62, and 1.27 (multiplets, —CH$_2$—, 56 H), and 0.88 (triplet, —CH$_3$, 6 H); The product in chloroform-d exists as an equilibrium mixture of keto (about 68%) and enol (about 32%) tautomers which account for additional nmr singlets at 3.22 and 5.18 ppm in a ratio of 2:1, respectively.

Dioleyl 3-hydroxyglutarate. Sodium borohydride (46.36 g, 1.22 mole) in 800 mL of ice water and dioleyl 3-oxoglutarate (525.0 g, about 0.81 mole) in 800 mL diethyl ether are combined in a 3000 mL flask containing a magnetic stirrer bar and the two phase mixture is stirred vigorously at ambient temperature for 22.5 hours. The ether layer is separated, washed twice with 800 mL portions of 5% aqueous HCl, and washed twice with 800 mL portions of water. The ether solution is evaporated on a vacuum rotary evaporator to give 504.3 g (about 96% yield) of straw colored oil. Excess oleyl alcohol is removed by passage of the crude product through a falling film still (168° C., 0.8 mm Hg). An nmr spectrum of the final product is consistent with the title structure; chemical shift in ppm (multiplicity, assignment, relative intensity): 5.35 (apparent triplet, HC=CH, 4 H), 4.46 (quintet of doublets, methane H, 1H), 4.10 (triplet, O—CH$_2$—, 4 H), 3.45 (doublet, —O—H, 1 H), 2.55 (doublet, HO—C—CH$_2$—C=O, 4

H), 2.00, 1.63, and 1.26 (multiplets, —CH$_2$—, 56 H), and 0.88 (triplet, —CH$_3$, 6 H).

1:2 Adduct of Adipoyl chloride and Dioleyl 3-hydroxyglutarate. Dioleyl 3-hydroxyglutarate (32.45 g, 0.05 mole) and adipoyl chloride (4.58 g, 0.025 mole) are combined in a 100 mL flask containing a magnetic stir bar and sealed with a stopcock. The mixture is heated with stirring at 110°–115° C. for 24 hours under 125 mm Hg vacuum. The reaction mixture at this point exhibits a weight loss which is consistent with the formation of HCl as a volatile reaction by-product. The nmr spectrum of the isolated, red orange oil in deuterochloroform is consistent with the 1:2 adduct structure; chemical shift in ppm (multiplicity, assignment, relative intensity): 5.51 (quintet, methine H, 2H), 5.35 (apparent triplet, HC=CH, 8 H), 4.07 (triplet, O=C—O—CH$_2$—, 8 H), 2.70 (doublet, HO—C—CH$_2$—C=O, 8 H), 2.29 (apparent triplet, O=C—CH$_2$— of adipate bridge, 4 H), 2.01, 1.62 and 1.31 (multiplets, —CH$_2$—, 116 H) and 0.89 (triplet, —CH$_3$, 12 H).

EXAMPLE 2

The process of Example 1 is repeated but this time employing glutaric anhydride and two equivalents of dioleyl 2-hydroxymethylmalonate to form a novel complex linked ester having the structural formula:

CH$_2$[CH$_2$CO$_2$CH$_2$CH-(CO$_2$CH$_2$(CH$_2$)$_7$CH=CH(CH$_2$)$_7$CH$_3$)$_2$]$_2$

EXAMPLE 3

The process of Example 1 can be repeated where the oleyl alcohol is replaced with myristyl alcohol to produce a fat mimetic compound of the formula:

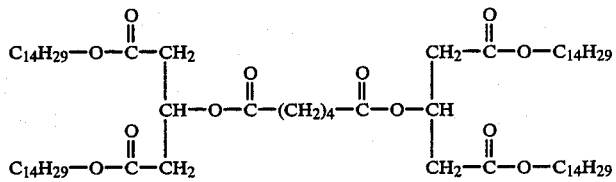

EXAMPLE 4

By essentially the same procedure as detailed in Example 1, sebacoyl chloride is reacted with two equivalents of dioleyl 2-hydroxymethylsuccinate to form a novel complex linked ester with a molecular formula of C$_{92}$H$_{166}$O$_{12}$.

EXAMPLE 5

This example shows the preparation, from intermediate to final molecular composition, of a fat mimetic material of the invention containing a linking dibasic acid unit and having the following structure:

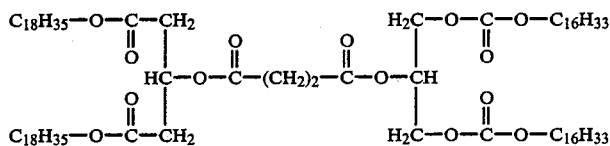

Mono-(dioleyl glutar-3-yl) succinate. A 500-mL round bottom flask, containing a magnetic stirrer bar, is charged with 62.2 g (0.096 mole) dioleyl 3-hydroxyglutarate, 13.8 g (0.14 mole) succinic anhydride, 3.2 g (0.026 mole) 4-(dimethylamino) pyridine and 200 mL of anhydrous pyridine. The resulting solution is stirred at ambient temperature for three days, and is poured into 1500 mL of water. This mixture is extracted with 4 x 400 mL portions of diethyl ether, and the combined extracts are washed with 5% aqueous HCl, and are dried over anhydrous Na$_2$CO$_3$. After filtration, the volatiles are removed on a vacuum rotary evaporator (45° C. and 100 Torr, then ambient temperature and 2 Torr). The yield of yellow oil is 58 g (82% of theory). The product is characterized by IR and NMR spectroscopy: IR, neat: 3.33–3.45 microns (very broad, —OH); 5.76 (strong, C=O); 6.29 (weak, C=C); 8.62 (strong, C—O); NMR, chloroform-d: 0.88 ppm (triplet, 6H, —CH$_3$); 1.30 (multiplet, 40H, —CH$_2$—); 1.61 (quintet, 4H, —O—CH$_2$—CH$_2$—CH$_2$—); 2.01 (multiplet, 8H, C=C—CH$_2$—); 2.65 (apparent doublet of doublets, 4H, O=C—CH$_2$—CH$_2$C=O); 2.71 (doublet, 4H, O=C—CH$_2$—CH—CH$_2$—C=O); 5.35 (multiplet, 4H, HC=CH); and 5.53 (quintet, 1H, —CH$_2$—CH—CH$_2$—).

Elemental Analysis: Calc. for C$_{45}$H$_{80}$O$_8$, FW 749.12: C 72.15, H 10.76; Found: C 72.15, H 10.87.

Mono-(dioleyl glutar-3-yl) succinoyl monochloride. A portion of the above acid ester (58.0 g, 0.0793 mole) and 200 mL of thionyl chloride are charged to a 500-mL round bottom flask, containing a magnetic stirrer bar, and fitted with a drying tube filled with Drierite. The reaction mixture is stirred at room temperature for 24 hours, whereupon the volatiles are removed on a vacuum rotary evaporator (60° C. and 100 Torr) to afford 59 g (99%) of a dark brown, viscous oil, whose structure is supported by its NMR spectrum: NMR, chloroform-d: 0.88 ppm (triplet, 6H, —CH$_3$); 1.30 (multiplet, 40H, —CH$_2$—); 1.61 (quintet, —O—CH$_2$—CH$_2$—CH$_2$—); 2.01 (multiplet, 8H, C=C—CH$_2$—); 2.65 and 3.20 (apparent triplets, 2H and 2H, O=C—CH$_2$—CH$_2$—C=O); 2.72 (doublet, 4H, O=C—CH$_2$—CH—CH$_2$—C=O); 4.07 (triplet, 4H, —O—CH$_2$—); 5.35 (multiplet, 4H, HC=CH); and 5.56 (quintet, 1H, —CH$_2$—CH—CH$_2$—).

Elemental Analysis: Calc. for C$_{45}$H$_{79}$ClO$_7$ FW 767.57: C 70.42, H 10.37, Cl 4.62; Found: C 67.69, H 10.01, Cl 7.30. The elemental analysis, including the higher than expected value determined for chlorine is consistent with product contamination with 0.57 wt % (or 4.1 mole %) thionyl chloride.

1:1 adduct between mono-(dioleyl glutar-3-yl) succinoyl mono-chloride and 1,3-dipalmitoyl glycerol. In a dry, 250-mL, single neck flask containing a magnetic stirrer bar and fitted with a thermometer and a vacuum stopcock are combined 56.9 g (0.1 mole) 1,3-dipalmitoyl glycerol and a 76.8 g portion (0.1 mole) of mono-(diol-eyl glutar-3-yl) succinoyl monochloride prepared above. The flask is sealed and placed under vacuum while being heated to 110° C. by means of a heating mantle. The mixture is heated with stirring for sufficient time to yield substantial conversion of reactants to product. After cooling to ambient temperature, the product is characterized by proton NMR spectroscopy (in chloroform-d). The result is consistent with formation of the expected 1:1 adduct between the triester acid chloride and the dipalmitin.

EXAMPLE 6

In this example, the process of Example 1 is repeated where the adipoyl chloride in Example 1 is replaced with the diacid chloride of diglycolic acid to produce the following compound was prepared by the process described below:

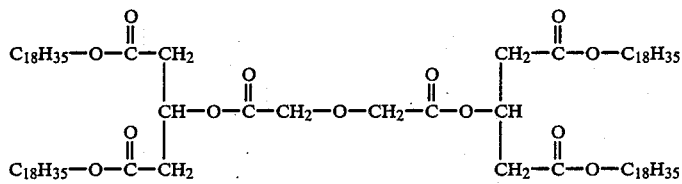

EXAMPLE 7

In this example, the following compound was prepared by the process described below:

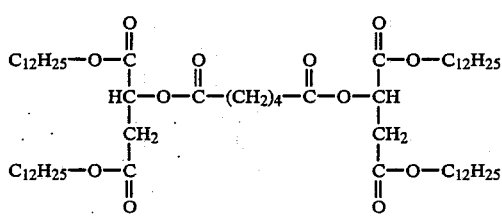

Didodecyl 2-hydroxysuccinate. Trichloroacetic acid (13.2 g., 0.08 mole), 302.2 g (2.25 mole) D,L-malic acid and 931.9 g (5.00 mole) dodecanol are combined in a 3000-mL flask containing a magnetic stirrer bar and fitted with a thermometer and a vacuum distillation head. The apparatus is placed under 170~Torr vacuum and warmed to 135° for 6.5 hours. Water distills from the reaction mixture under these conditions. The reaction mixture is cooled to 60° C., and is passed twice through a falling film still (168° C., 0.8 Torr) to give 935.6 (88%) of the title composition as a white solid, mp 27°–30° C. Proton nmr spectrum in CDCl$_3$: chemical shift in ppm (multiplicity, intensity, assignment): 4.49 (doublet of doublets J=6.0, 4.5 Hz, 1 H, methine proton), 4.20 (overlapping triplets, 2H, O—CH$_2$), 4.11 (triplet, 2 H, O—CH$_2$), 2.86 (doublet of doublets J=16.5, 4.5 Hz, 1 H, half of O=C—C—CH$_2$—C=O), 2.78 (doublet of doublets J=16.5, 6.0 Hz, 1 H, half of O=C—C—CH$_2$—C=O), 1.64 (multiplet, 4 H, O—C—CH$_2$), 1.29 (multiplet, 36 H, —CH$_2$—) and 0.89 (triplet, 6 H, —CH$_2$). The chemical shift for the hydroxyl proton is seen at 2.93 (broad singlet, 1 H, OH) in preparations carried out with sulfuric acid catalyst. Reaction is also completed in the absence of a catalyst.

Analysis: calc for C$_{28}$H$_{54}$O$_5$, FW 470.73: C 71.44, H 11.56, O 17.00%.

Bis-(didodecyl 2-succinyl) adipate. Didodecyl 2-hydroxysuccinate (1101.7 g, 2.34 mole) is melted by warming to about 65° C. and is combined with 214.2 g (1.17) mole) adipoyl chloride in a 2000-mL flask containing a magnetic stir bar and fitted with a thermometer and a vacuum distillation head which is connected to a trap containing 110 g KOH. The reaction mixture is placed under vacuum (200 Torr) and evolution of HCl begins. After one hour, external heat is applied to raise the temperture to 73° C. After stirring under vacuum at this temperature overnight, the temperature is raised to 115° C. for two hours. The product is then transferred to a steam deodorizer and is stripped with steam at 190° C. and 0.5 Torr to give a clear, pale yellow oil (yield: 1194.0 g, 97%). Proton nmr spectrum in CDCl$_3$: chemical shift in ppm (multiplicity, intensity, assignment): 5.47 (triplet, 2 H, methine proton), 1.14 and 4.10 (overlapping triplets, 8 H, O—CH$_2$), 2.88 (doublet, 4 H, O=C—CH$_2$—C=O), 2.40 (multiplet, H, adipate O=C—CH$_2$, 1.70 and 1.62 (multiplets, 12 H, adipate O=C—C—CH$_2$ and dodecyl O—C—CH$_2$), 1.30 (multiplet, 72 H, CH$_2$) and 0.88 (triplet, 12 H, CH$_3$).

EXAMPLE 8

In this example, the process of Example 7 is repeated where the dodecanol of Example 1 is replaced with oleyl alcohol.

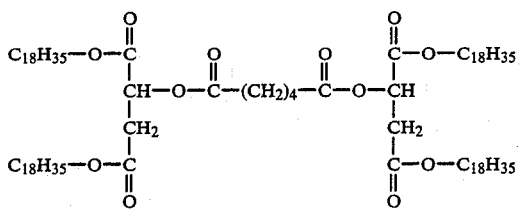

Any of the Fat Mimetic compounds produced in Examples 1–8 can be used in foods. Improved quality of these compounds for such purposes can be achieved through use of one or more conventional edible oil refining techniques including: filtration, clay bleaching, steam deodorization, alkali refining, centrifugation, acid washing, molecular distillation, etc.

EXAMPLE 9

Sweet Chocolate. A low calorie sweet chocolate may be prepared by blending

| Ingredient | parts |
| --- | --- |
| Cocoa Powder | 1.0 |
| Sugar | 1.0 |

To this is added a portion of

| Example 5 Fat Mimetic | 1.0 |

Mix thoroughly and pass through a refiner to reduce the particles to desired size. The material is conched, and the remaining fat mimetic is added. The mixture is poured into molds and quenched cooled. No tempering regimen is necessary.

EXAMPLE 10

Chocolate Chips. The chocolate prepared in Example 5 is deposited into nibs and processed in the usual process.

EXAMPLE 11

Chocolate Chip Cookies. Reduced calorie crisp chocolate chip cookies may be prepared by blending

| Ingredient | parts |
| --- | --- |
| Flour | 22.0 |
| Example 1 Fat Mimetic | 20.0 |
| Salt | 0.7 |
| Sodium Bicarbonate | 0.1 |
| Monocalcium Phosphate | 0.1 |
| Vanillin | 0.1 |
| Water | 8.0 |

To this is added

| Sugar | 30.0 | which is mixed until dispersed. Then

| Example 10 Chocolate Chips | 19.0 | is added and mixed until just blended prior to depositing and baking in the usual process.

EXAMPLE 12

Chewy Chocolate Chip Cookies. Chewy chocolate chip cookies may be prepared by combining

| Ingredient | parts |
| --- | --- |
| Sugar | 24.3 |
| Invert Sugar | 20.0 |
| Flour | 13.7 |
| Example 7 Fat Mimetic | 13.0 |
| Frozen Whole Eggs | 2.0 |
| Sodium Bicarbonate | 0.1 |
| Monocalcium Phosphate | 0.1 |
| Vanillin | 0.1 |
| Water | 7.7 |

To this is added

| Example 10 Chocolate Chips | 19.0 | and mixed until just dispersed prior to depositing and baking in the usual process.

EXAMPLE 13

Sandwich Cookies. A base cake may be prepared by combining

| Ingredient | parts |
| --- | --- |
| Flour | 48.0 |
| High Fructose Corn Syrup | 12.0 |
| Sugar (6X) | 10.0 |
| Example 1 Fat Mimetic | 10.0 |
| Dutched Cocoa | 5.0 |
| Corn Syrup (42 D.E.) | 3.0 |
| Dextrose | 2.0 |
| Frozen Whole Eggs | 2.0 |
| Salt | 0.3 |
| Sodium Bicarbonate | 0.2 |
| Lecithin | 0.2 |
| Vanilla | 0.2 |
| Ammonium Bicarbonate | 0.1 |
| Water | 7.0 | mixing well, rotary molding, baking and cooling. A filler may be prepared by melting

| Example 5 Fat Mimetic | 37.0 | and adding

| Sugar 10X | 62.7 |
| Vanillin | 0.3 |

Cool filler to 78° F. and sandwich between base cakes in a ratio of 1 to 3.

EXAMPLE 14

Vanilla Wafers. Vanilla wafers may be prepared by combining and mixing well

| Ingredient | parts |
| --- | --- |
| Flour | 40.0 |
| Sugar (10X) | 28.0 |
| Example 3 Fat Mimetic | 13.0 |
| Frozen Whole Eggs | 6.0 |
| High Fructose Corn Syrup | 4.0 |
| Salt | 0.7 |
| Vanilla | 0.3 |
| Sodium Bicarbonate | 0.3 |
| Sodium Aluminum Phosphate | 0.1 |
| Ammonium Bicarbonate | 0.1 |
| Water | 7.5 | aerating, and depositing onto a baking surface and baking in the usual manner.

EXAMPLE 15

White Layer Cake. A white layer cake may be prepared by combining

| Ingredient | parts |
| --- | --- |
| Sugar | 30.0 |
| Flour | 25.0 |
| Frozen Whole Eggs | 16.0 |
| Example 3 Fat Mimetic | 14.7 |
| Nonfat Dry Milk | 13.0 |
| Sodium Bicarbonate | 0.7 |
| Vanilla | 0.4 |
| Salt | 0.2 | mixing well, panning off, and baking in the usual process.

EXAMPLE 16

Chocolate Icing. Chocolate icing may be prepared by blending, being careful not to incorporate air:

| Ingredient | parts |
|---|---|
| Sugar (12X) | 65.0 |
| Example 1 Fat Mimetic | 11.0 |
| Dutched cocoa | 10.5 |
| Nonfat Dry Milk | 4.0 |
| Frozen Egg Yolk | 4.0 |
| Salt | 0.25 |
| Vanilla | 0.25 |
| Water | 5.0 |

The icing can be used immediately or packaged and frozen for later use.

EXAMPLE 17

Butter Cream Icing. Butter cream icing is prepared by blending:

| Ingredient | g. |
|---|---|
| Sugar | 227 |
| Example 1 Fat Mimetic | 70.8 |
| Water | 28.4 |
| Non Fat Dry Milk | 14.0 |
| Emulsifier | 1.4 |

| | parts |
|---|---|
| Salt | 1.0 |
| Vanilla | 1.0 |

All of the ingredients are creamed in a mixer at medium speed.

EXAMPLE 18

Pie Crust. A pie crust may be prepared by blending

| Ingredient | parts |
|---|---|
| Flour | 58.0 |
| Whey | 1.5 |
| Salt | 1.5 |
| Sodium Steroyl-2 Lactylate | 1.0 |

To this is added

| | |
|---|---|
| Water | 7.0 |
| Example 3 Fat Mimetic | 26.0 |
| High Fructose Corn Syrup | 5.0 |

The dough is mixed until uniform prior to pressing into a pie plate and baking in the usual process.

EXAMPLE 19

Lemon Pie Filling. A pie filling may be prepared by premixing

| Ingredient | parts |
|---|---|
| Sugar (4X) | 17.5 |
| Unmodified Corn Starch | 2.0 |
| Modified Corn Starch | 1.8 |

To this is added

| | | |
|---|---|---|
| then | Water | 60.0 |
| | Corn Syrup | 11.5 |
| | Example 3 Fat Mimetic | 4.3 |
| | Lemon Powder | 1.0 |
| | Lemon Puree | 1.0 |
| | Dry Whole Egg | 0.5 |
| | Citric Acid | 0.2 |
| | Salt | 0.2 |

The mixture is heated to starch gelatinization temperature and used immediately or canned.

EXAMPLE 20

Whipped Topping. A whipped topping may be prepared by premixing

| | Ingredient | parts |
|---|---|---|
| with | Example 1 Fat Mimetic | 26.0 |
| | Mono- and Di-glycerides | 2.0 |

An aqueous phase is prepared by dissolving

| Ingredient, cont. | parts |
|---|---|
| Water | 46.6 |
| Sugar (4X) | 23.0 |
| Dextrose | 1.0 |
| Polysorbate 60 | 0.7 |
| Sorbitan Monostearate | 0.3 |
| Carageenan | 0.2 |
| Guar Gum | 0.1 |
| Vanilla | 0.1 |

The oil blend is then added to the aqueous phase with high agitation. The topping can be packaged and refrigerated or frozen.

EXAMPLE 21

Pudding. Pudding can be prepared from the following formulation:

| Ingredient | parts |
|---|---|
| Milk | 67 |
| Sugar | 11 |
| Starch | 5 |
| Water | 9 |
| Flavor | 3 |
| Example 1 Fat Mimetic | 5 |

The ingredients can be blended together and heated to form a pudding.

EXAMPLE 22

Soda Crackers. Soda crackers may be prepared by pre-mixing ¼ of

| Ingredient | parts |
|---|---|
| Flour | 70.0 |
| Yeast | 0.2 | and sufficient water to make a dough. This is fermented for 24 hours. To the remaining flour and yeast, the following is added and blended:

| Ingredient | parts |
|---|---|
| Water | 20.0 |
| Malt Syrup | 0.69 |
| Sodium Bicarbonate | 0.40 |
| Malt | 0.01 |

After the ferment is added and mixed again, the blend is proofed for 8 hours, sheeted, and baked. Afterwards,

| Ingredient | parts |
|---|---|
| Example 1 Fat Mimetic | 7.0 | is applied to the crackers with

| Ingredient | parts |
|---|---|
| Salt | 1.7 | prior to packaging.

EXAMPLE 23

Sprayed Crackers. A dough prepared from

| Ingredient | parts |
|---|---|
| Flour | 100 |
| Sugar | 5.0 |
| Malt | 1.5 |
| Fat Mimetic of Example 1 | 7.5 |
| Salt | 1.0 |
| Sodium Bicarbonate | 0.9 |
| Nonfat Dry Milk | 2.5 |
| High Fructose Corn Syrup | 2.5 |
| Monocalcium Phosphate | 0.75 |
| Water | 28 | is sheeted, stamped, and baked to produce a cracker product, then sprayed with the Fat Mimetic of Example 1 prior to packaging.

EXAMPLE 24

Peanut Butter. Peanut butter may be prepared by mixing

| | Ingredient | parts |
|---|---|---|
| with | Example 1 Fat Mimetic | 35.0 |
| | Peanut Flavor | 2.0 |
| Then | Corn Syrup Solids | 12.0 |
| | Salt | 1.0 |
| | High Fructose Corn Syrup | 10.0 | are added while agitating. When well blended, add

| Ingredient | parts |
|---|---|
| Defatted Peanut Flour | 40.0 | mix and package.

EXAMPLE 25

Ice Cream. Vanilla ice cream may be prepared by mixing

| | Ingredient | parts |
|---|---|---|
| | Sugar (10X) | 15.0 |
| | Nonfat Dry Milk | 3.9 |
| | Salt | 0.4 |
| into | Water | 39.0 | for 3 minutes. Then add melted

| Ingredient | parts |
|---|---|
| Example 4 Fat Mimetic | 28.4 | and cook to 200° F. while mixing. Hold for 1 minute. Cool to 160° F., and add

| Ingredient | parts |
|---|---|
| Sugared Egg Yolks | 12.5 |
| Vanilla Extract | 0.8 | and mix 1 minute. Cool and freeze to desired overrun.

EXAMPLE 26

Filled Cream. To make a "filled cream" composition, homogenize about

| Ingredient | kg |
|---|---|
| Example 4 Fat Mimetic | 30.0 |
| Skim Milk | 69.9 |
| Polysorbate 80 | 0.1 | in a conventional dairy homogenizer.

EXAMPLE 27

Filled Milk. To prepare a "filled milk" composition, combine about

| Ingredient | parts |
|---|---|
| Example 26 Filled Cream | 100 |
| Skim Milk | 900 | and rehomogenize.

EXAMPLE 28

Low Calorie Milk. A low calorie "whole milk" may be prepared by combining

| Ingredient | parts |
|---|---|
| Nonfat Milk | 96.4 |
| Fat Mimetic of Example 1 | 3.5 |
| Lecithin | 0.1 | mixing and homogenizing.

EXAMPLE 29

Cream Cheese. To make an imitation cream cheese, add

| Ingredient | parts |
|---|---|
| Water | 53 |
| Calcium Caseinate | 6.7 |
| Buttermilk Powder | 3.9 |
| Emulsifiers | 0.2 |
| Xanthan Gum | 0.2 | and mix three minutes. Melt

| Ingredient | parts |
|---|---|
| Fat Mimetic of Example 1 | 35.5 | and cook to 200° F. while mixing. Hold for one minute. Then cool to 150° F. and add

EXAMPLE 30

Cheddar-Style Cheese. To make Cheddar-style cheese, homogenize

| Ingredient | parts |
|---|---|
| Nonfat Milk | 75.0 |
| Low Temperature Nonfat Dry Milk | 4.0 |
| Fat Mimetic of Example 1 | 20.0 |

To this is added

| | | |
|---|---|---|
| | Salt | 0.7 |
| | Lactic Acid Culture | 0.3 |
| | Flavor, Acid and Color | 0.5 | and mix one minute. Fill, then cool and store.

The mixture is fermented and pressed to a final composition of approximately 37.0% moisture, 63.0% total solids, and 32.0% fat mimetic.

EXAMPLE 31

Process Pimento Cheese Food. Processed pimento cheese food may be prepared by melting

| | Ingredient | % |
|---|---|---|
| | Example 30 Cheddar Cheese | 43.0 |
| and | Swiss cheese | 44.0 |

Into this is blended

| | | |
|---|---|---|
| | Dehydrated Pimento | 0.3 |
| and | Water | 12.7, | and the mixture is cast into blocks.

EXAMPLE 32

Imitation Sour Cream. An imitation sour cream may be prepared by adding

| | Ingredient | % |
|---|---|---|
| | Water | 75.8 |
| to | Modified Starch | 2.0 |
| | Avicel | 1.0 |
| | Distilled Monoglyceride | 0.7 |
| and | Polysorbate 60 | 0.3 | and mixing three minutes. To this is added

| Fat Mimetic of Example 4 | 16.5 |
|---|---|
| Condensed Skim Milk | 3.5, | and the mixture is mixed three minutes, cooked to 195° F., and held five minutes. This may then be cooled to 60° F., and

| Flavors and Acids | 0.2 |
|---|---| added, followed by filling in the usual process.

EXAMPLE 33

Mayonnaise. Mayonnaise may be prepared by adding

| | Ingredient | % |
|---|---|---|
| | Water | 5.0 |
| to | Sugar | 1.5 |
| | and Spices | 3.5 | and mixing three minutes. To this is added

| Salted Egg Yolks | 8.0 |
|---|---| followed by mixing two minutes, adding

| Fat Mimetic of Example 1 | 80.0 |
|---|---|
| then 120 Distilled Vinegar | 2.0. |

The mixture is blended 3 minutes and passed through a colloid mill set at 60 prior to filling in the usual process.

EXAMPLE 34

Salad Dressing. Salad dressing may be prepared by adding

| | Ingredient | parts |
|---|---|---|
| | Water | 29.0 |
| to | Sugar | 12.0 |
| | and Spices | 4.5 | and mixing three minutes. Then

| Salted Egg Yolks | 5.5 |
|---|---|
| and Modified Starch | 3.0 | are added and mixed two minutes. To the aqueous mixture are added

| Fat Mimetic of Example 1 | 40.0 |
|---|---|
| then 120 Distilled Vinegar | 6.0. |

The mixture is then mixed three minutes and passed through a colloid mill set at 60 prior to filling in the usual process.

EXAMPLE 35

Italian Dressing. To make Italian dressing, add

| | Ingredient | parts |
|---|---|---|
| | Sugar | 4.0 |
| | Xanthan Gum | 0.12 |
| | to Water | 21.5 | at 125°-130° F. and mix three minutes. Then add

| Garlic Vinegar Puree | 1.5 |
|---|---|
| Lemon Juice | 4.0 |
| White Vinegar (120) | 13.0 | and mix three minutes. Add

| | |
|---|---|
| Salt | 4.5 |
| Minced Garlic | 0.75 |
| Minced Onion | 0.50 |
| Red Bell Peppers | 0.05 |
| B.I. Spice Blend | 0.08 | and mix three minutes. Fill this aqueous phase 50% by weight with

| | |
|---|---|
| Fat Mimetic of Example 1 | 50.0 | by weight.

EXAMPLE 36

French Dressing. French dressing may be prepared by adding

| Ingredient | parts |
|---|---|
| Water | 31.09 |
| to Sugar | 15.00 |
| Salt | 2.50 |
| Spices | 2.40 |
| Xanthan Gum | 0.25 |
| Alginate | 0.14 |
| Polysorbate 60 | 0.12 | and mixing three minutes. Then

| | |
|---|---|
| 120 Distilled Vinegar | 12.00 |
| and Fat Mimetic of Example 1 | 36.50 | are added, mixed three minutes, and homogenized at 500 psi prior to filling in the usual process.

EXAMPLE 37

Dijon Mustard. A Dijon-style mustard may be prepared by combining

| Ingredient | parts |
|---|---|
| Dry White Wine | 66.1 |
| with Water | 5.0 | and bringing to a boil. To this aqueous phase is added

| | |
|---|---|
| Ground, Defatted Yellow Mustard Seed | 12.4 |
| Fat Mimetic of Example 1 | 6.1 |
| Honey | 6.6 |
| Onion Powder | 2.0 |
| Salt | 1.3 |
| Garlic Powder | 0.3 |
| Mustard Oleo Resin | 0.2 |

The mixture is well blended, pasteurized, and packaged.

EXAMPLE 38

Margarine. A margarine may be prepared by emulsifying

| | parts |
|---|---|
| Oil Phase Ingredients | |
| Fat Mimetic of Example 1 | 68.6 |
| Liquid Corn Oil | 0.55 |
| Partially Hydrogenated Corn Oil | 0.45 |
| Lecithin | 0.30 |
| Mono- and Di-Glycerides | 0.21 |
| Margarine Flavor and Color | 0.0062 |
| Aqueous Phase Ingredients | |
| Water | 25.8 |
| Whey | 1.00 |
| Salt | 2.00 |
| Sodium Benzoate | 0.086 |
| Potassium sorbate | 0.066 |
| CaEDTA | 0.0015 | and passing the emulsion through a cool scraped surface heat exchanger in the usual process.

EXAMPLE 39

Low Fat Spread. A 60% table spread may be prepared by emulsifying

| | parts |
|---|---|
| Oil Phase Ingredients | |
| Fat Mimetic of Example 1 | 59.58 |
| Lecithin | 0.20 |
| Monoglycerides from 5 IV Hydrogenated Soybean Oil | 0.20 |
| Beta-carotene and Vitamin A Palmitate in Corn Oil | 0.005 |
| Flavor | 0.010 |
| with Aqueous Phase Ingredients | |
| Water | 36.865 |
| Salt | 2.00 |
| Whey | 1.00 |
| Potassium Sorbate | 0.10 |
| Phosphoric Acid | 0.04 | and passing the emulsion through a cool scraped surface heat exchanger in the usual process.

EXAMPLE 40

Shortening. A shortening may be prepared by mixing

| Ingredient | parts |
|---|---|
| Fat Mimetic of Example 1 | 95 |
| with Soybean Oil (70 IV) | 5 |
| Mono- and Diglycerides | |

EXAMPLE 41

Puff Pastry Shortening. A puff pastry shortening may be prepared by homogenizing

| Ingredient | parts |
|---|---|
| Fat Mimetic of Example 1 | 68.0 |
| Fat Mimetic of Example 3 | 22.0 |
| Soybean Lecithin | 0.1 |
| Mono- and Diglycerides (0 IV) | 0.2 |
| with Water | 8.2 |
| Salt | 1.5 |

EXAMPLE 42

Frying Oil. A frying oil may be prepared by adding 1 ppm polydimethylsiloxane to the Fat Mimetic of Example 1.

EXAMPLE 43

Potato Chips. Whole peeled potatoes may be sliced, washed in water, and fried in the Frying Oil of Example 42 at 375° F. to desired color. The excess oil is shaken off and the chips are salted. The finished product contains about 35% fat mimetic.

EXAMPLE 44

Bologna. To make bologna, chop together

| Ingredient | parts |
|---|---|
| Boneless Mutton | 40.0 |
| Pork Hearts | 15.0 |
| Beef Trimmings (75/25) | 10.0 |
| Pork Blade Meat | 5.0 | adding ice to control temperature. Then add

| | |
|---|---|
| Seasoning | 7.0 |
| Fat Mimetic of Example 1 | 13.0 |
| and Water/Ice | 10.0 |

The mixture can be stuffed into casing, smoked, and packaged.

EXAMPLE 45

Italian Sausage. To make Italian sausage, chop

| Ingredient | parts |
|---|---|
| Lean Beef | 52.6 |
| Lean Pork | 26.3 | together. Pre-blend

| | |
|---|---|
| Fat Mimetic of Example 1 | 9.8 |
| Salt | 1.7 |
| Chili Powder | 1.3 |
| Paprika | 0.9 |
| Coriander | 0.01 |
| Nutmeg | 0.01 |
| Ground Caraway | 0.005 |
| Celery | 0.005 | and add to meats. Add

| | |
|---|---|
| Pimento | 7.37 | with juice and chop until well mixed. Grind through ⅜" plate, stuff into casings and cook at 150° F. for 30 minutes. Smoke and package.

EXAMPLE 46

Cubed Soup Stock. To make cubed soup stock, blend

| Ingredient | parts |
|---|---|
| Salt | 67.0 |
| Dry Beef Broth | 25.0 |
| Celery Salt | 1.0 |
| Melt | |
| Fat Mimetic of Example 3 | 7.0 | and spray into the mixing dry ingredients. Press into cubes and package.

EXAMPLE 47

Pet Food. A dry pet food may be prepared by mixing

| Ingredient | parts |
|---|---|
| Ground Wheat Middlings | 56.9 |
| Meat and Bone Meal | 15.0 |
| Defatted Soya Meal | 15.0 |
| Sugar | 3.0 |
| Sodium Aluminum Phosphate | 0.4 |
| Sodium Bicarbonate | 0.4 |
| Vitamin Mix | 0.2 |

To this is added

| | |
|---|---|
| Fat Mimetic of Example 1 | 1.0 | and water sufficient for processing. The ingredients are remixed and cooker extruded. The product is bake-dried to approximately 2.5% moisture and surface coated with

| | |
|---|---|
| Fat Mimetic of Example 1 | 9.0 | prior to packaging.

EXAMPLE 48

Breakfast Sausage. To make breakfast sausage, premix

| Ingredient | parts |
|---|---|
| Salt | 1.7 |
| White Pepper | 0.34 |
| Sugar | 0.18 |
| Sage | 0.17 |
| Ginger | 0.06 |
| Cardamon | 0.02 |
| Marjoram | 0.02 |
| Savory | 0.01 |
| Chop | |
| Trimmed Cali Pork Butts | 45.0 |
| Fat Mimetic of Example 3 | 35.0 |
| Ham Fat | 17.5 | with spices until blended. Grind through 3/16" plate. Package and refrigerate until use.

EXAMPLE 49

Corn Puff Cereal. To make corn puff cereal, mix

| Ingredient | parts |
|---|---|
| Corn Flour | 48.5 |
| Defatted Corn Bran | 25.0 |
| Sugar (4x) | 7.5 |
| Rice Flour | 6.0 | together. To this is added

| | |
|---|---|
| Fat Mimetic of Example 1 | 5.5 |
| Honey | 7.5 |

The mixture is blended until uniform, cooker extruded to desired shape, and dried to a moisture content of approximately 2% prior to packaging.

EXAMPLE 50

Dry Pancake Mix. A dry pancake mix may be prepared by combining

| Ingredient | parts |
|---|---|
| Soft Wheat Flour | 58.0 |
| Corn Flour | 11.0 |
| Rye Flour | 10.0 |
| Sugar (6X) | 7.0 |
| Nonfat Dry Milk | 3.5 |
| Sodium Bicarbonate | 1.8 |
| Sodium Acid Pyrophosphate | 1.5 |
| Dry Whole Egg | 1.0 |
| Monocalcium Phosphate | 0.2 |
| Then | |
| Fat mimetic of Example 1 | 6.0 | is sprayed onto the dry ingredients as they mix. The mixture is then blended and packaged.

EXAMPLE 51

Bread. To make bread, combine

| Ingredient | parts |
|---|---|
| Flour | 52.0 |
| Water | 32.0 |
| Sugar | 5.0 |
| Fat Mimetic of Example 3 | 4.7 |
| Yeast | 2.5 |
| Nonfat Dry Milk | 2.5 |
| Salt | 1.3 |

The mixture is proofed four hours, punched down, panned, and proofed until desired volume is achieved prior to baking, slicing, and packaging in the usual manner.

EXAMPLE 52

Heat and Serve Rolls. To make heat and serve rolls, combine

| Ingredient | parts |
|---|---|
| Sugar | 5.7 |
| Fat Mimetic of Example 3 | 5.7 |
| Frozen Whole Eggs | 2.9 |
| Nonfat Dry Milk | 1.9 |
| Yeast | 1.4 |
| Salt | 0.9 |
| Water | 33.5 | and blend well. Add

| Flour | 48.0 |
|---|---| and mix. Proof for 4 hours. De-gas, divide into rolls, package, and freeze.

EXAMPLE 53

Coffee Whitener. A coffee whitener may be prepared by premixing

| Ingredient | parts |
|---|---|
| Corn Syrup Solids | 43.0 |
| Sodium Caseinate | 8.7 |
| Mono- and Diglycerides | 3.0 |
| Dipotassium Phosphate | 1.0 |
| Vanillin | 0.2 |

While blending continues

| Fat Mimetic of Example 1 | 44.0 |
|---|---|
| Butter Flavor | 0.1 | are added, and the mixture is packaged.

EXAMPLE 54

Fudge Base. A fudge base suitable as a milk mix (or topping) may be prepared by mixing

| Ingredient | parts |
|---|---|
| Corn Syrup | 26.0 |
| Corn Starch | 2.0 |
| Vanilla | 2.0 |
| To this are added | |
| Cocoa Powder | 25.0 |
| Fat Mimetic of Example 3 | 30.0 |
| Fat Mimetic of Example 1 | 15.0 |

The mixture is blended well and heated to pasteurizing temperature before packaging.

EXAMPLE 55

Caramel. To make caramel, mix

| Ingredient | parts |
|---|---|
| Sugar (4X) | 11.0 |
| Invert Sugar | 10.0 |
| Condensed Skim Milk | 30.0 |
| Then | |
| Corn Syrup (64 D.E.) | 40.0 |
| Fat Mimetic of Example 4 | 8.0 |
| Salt | 1.0 |

Cook to about 240° F. and cast into a final product or use as an ingredient in other confections.

EXAMPLE 56

Bubble Gum. A gum base may be made by melting together

| Ingredient | parts |
|---|---|
| Gum Resin | 35 |
| Calcium Carbonate Filler | 30 |
| Fat Mimetic of Example 4 | 23 |
| Elastomer | 12 |

To 25% of the base add

| Corn Syrup (63 D.E.) | 20 |
|---|---|
| Glycerol | 5 |
| Sugar (12X) | 49 |
| Color and Flavor | 1 |

The mixture can be cooled and cut to size.

EXAMPLE 57

Milk Liqueur. To make a shelf stable milk liqueur, blend

| Ingredient | part |
|---|---|
| Sugar | 21.0 |
| Water | 79.0 | until dissolved. To 25% of this sugar solution, add

| | |
|---|---|
| Ethanol | 47.0 |
| Water | 28.0 | to make a liqueur stock. To make the milk liqueur, mix

| | |
|---|---|
| Liqueur Stock | 90.90907 |
| Nonfat Milk | 7.90513 |
| Fat Mimetic of Example 1 | 1.18577 |
| Orange Oil | 0.000016 |
| Cinnamon Oil | 0.000008 |
| Anise Oil | 0.000004 |
| Clove Oil | 0.000004 |
| Rose Oil | 0.000004 |

Mix, homogenize, and bottle.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention which is defined by the following claims.

We claim:

1. A process for producing a food product containing a fat mimetic compound of the following formula:

$$R-(C(=O)-O-R')_n,$$

wherein the R is a linking covalent bond or aliphatic group, n is 2 to 6, and the R' groups comprise residues defined by the formula:

$$(X-C(-(CX_a)_bQ_d)(-(CX_f)_gQ_h)-Q)_e,$$

wherein
C is a carbon atom;
X is a bridging bonding valence, hydrogen, or a substituted or unsubstituted lower aliphatic group, the various X groups being the same or different;

Q is $-C(=O)-O-R''$ (carboxylate), $-R'''-C(=O)-O-R''$ (alkylcarboxylate), $-O-C(=O)-R''$ (carboxy), $-R'''-O-C(=O)-R''$ (alkylcarboxy), $-O-R''$ (alkoxy), or $-R'''-O-R''$ (alkylalkoxy) radical, wherein at least one of the Q radicals is other than carboxy;
R'' is a substituted or unsubstituted aliphatic group, containing 1 to 30 carbons,
the various R' and R'' groups, respectively, being the same or different;
R''' is a lower alkylene;
and, wherein:
a=0 to 3;
b=0 to 4;
d=1 or 2;
e=0 to 5;
f=0 to 3;
g=0 to 4; and
h=1 or 2,
from a base reactant compound of the following formula:

$$(Y-C(-(CY_a)_bQ^o_d)(-(CY_f)_gQ^o_h)-Q^o)_e,$$

wherein
Y is a hydroxyl, hydrogen, or substituted or unsubstituted lower aliphatic group, the various Y groups being the same or different and $Q^o$ is $-C(=O)-O-R'''^o$ (carboxylate), $-R'''-C(=O)-O-R'''^o$ (alkylcarboxylate), $-O-C(=O)-R'''^o$ (carboxy), $-R'''-O-C(=O)-R'''^o$ (alkylcarboxy), $-O-R'''^o$ (alkoxy), or $-R'''-O-R'''^o$ (alkylalkoxy) radical, wherein at least one of the $Q^o$ radicals is other than carboxy;
R'''^o is a substituted or unsubstituted aliphatic group, containing 1 to 30 carbons,
the various R' and R'' groups, respectively, being the same or different said process comprising:
reacting said base reactant compound with a substituent reactant compound of either of the following formulae:

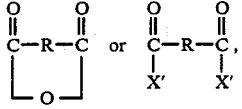

wherein X' is a halogen element or a hydroxyl group, under conditions at which said fat mimetic compound will be formed;

purifying said product compound; and
incorporating said product compound in a food product.

2. A process according to claim 1, wherein said fat mimetic product compound is formed by reacting said base reactant compound and one of said substituent reactant compounds in a single step.

3. A process according to claim 2, wherein said base reactant compound and said substituent reactant compound are reacted in a 2:1 molar ratio.

4. A process according to claim 3, wherein said substituent reactant compound is adipoyl chloride and said base reactant compound is dioleyl 3-hydroxyglutarate.

5. A process according to claim 3, wherein said substituent reactant compound is glutaric anhydride and said base reactant compound is dioleyl 2-hydroxymethylmalonate.

6. A process according to claim 3, wherein said substituent reactant compound is adipoyl chloride and said base reactant compound is dodecyl-2-hydroxysuccinate.

7. A process according to claim 1, wherein said fat mimetic product compound is formed by the following sequence of steps:
partially reacting said base reactant compound with said substituent reactant compound defined by the formula:

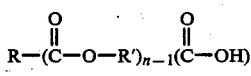

under conditions at which a first intermediate compound defined by the formula:

is formed;
reacting said first intermediate compound with a compound of the formula:

SOX'$_2$ under conditions at which a second intermediate compound defined by the formula:

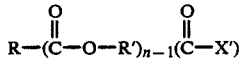

is formed; and
reacting said second intermediate compound with said base reactant under conditions at which said fat mimetic product compound will be formed.

8. A process according to claim 7, wherein said second intermediate compound and said base reactant are reacted in a 1:1 molar ratio.

9. A process according to claim 8, wherein said substituent reactant compound is succinic anhydride, said base reactant compound reacting with said substituent reactant compound is dioleyl 3-hydroxyglutarate, said first intermediate compound is mono-(dioleyl glutar-3-yl) succinate, said compound of the formula SOX'$_2$ is thionyl chloride, said second intermediate compound is mono-(dioleyl glutar-3-yl) succinoyl monochloride, and said base reactant compound reacting with said second intermediate is 1,3-dipalmitoyl glycerol.

10. A process according to claim 1 further comprising:
reacting a precursor compound defined by the formula:

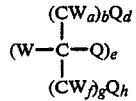

wherein
W is a double bonded oxygen, hydrogen, or substituted or unsubstituted lower aliphatic group (e.g., $C_1$-$C_4$), the various W groups being the same or different with at least one W group being double bonded oxygen,
with an alkali metal borohydride under conditions at which said base reactant compound will form and any double bonded oxygen groups in said precursor compound will be converted to hydroxyl groups in said base reactant compound.

11. A process according to claim 10 further comprising: reacting a starting compound defined by the formula:

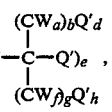

wherein

Q' is a 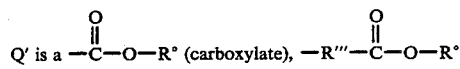

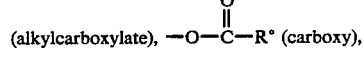

—O—R° (alkoxy), or —R°—O—R° (alkylalkoxy) radical, with the proviso that at least one of the Q' radicals be other than carboxy;
R° is a substituted or unsubstituted aliphatic group, containing, for example, no more than three carbons, the various R' and R° groups, respectively, being the same or different;
with a compound defined by the formula:

R"OH under conditions at which said precursor compound will form.

12. A process according to claim 1 wherein R is an aliphatic group having 1 to 6 carbons and n=2 to 4.

13. A process according to claim 12 wherein n=2.

14. A process according to claim 12 wherein the Q groups are derived from fatty acids having 8 to 22 carbon atoms.

15. A process for producing a food product containing a complex linked ester fat mimetic compound, the process comprising
(a) reacting two complex alcohols of the formula R'OH, wherein R' comprises one to three carbons to which are attached two to three carboxylate groups of the formula —(CO)—O—R″, where R″ is an aliphatic group having 1 to 30 carbons, the various R′ and R″ groups being the same or different, with a dibasic acid, or the chloride, anhydride or ester derivative of said acid;
(b) warming and stirring until the linkage reaction is substantially complete;
(c) isolating the linked ester product thereby produced; and
(d) incorporating the linked ester product in a food product.

16. A process according to claim 15 wherein two carboxylate groups are attached to said R′OH complex alcohol.

17. A process according to claim 15 wherein said dibasic acid has the formula R(COOH)$_2$, where R is an aliphatic group having 1 to 6 carbons.

18. A process according to claim 15 wherein said dibasic acid is selected from the group consisting of malonic, succinic, glutaric, adipic, maleic, fumaric, citraconic, mesaconic, sebacic, suberic, and diglycolic acids.

19. A process according to claim 15 wherein said acid is malonic, succinic, glutaric, or adipic acid.

20. A process according to claim 15 wherein said alcohols are reacted with a dibasic acid chloride.

21. A process according to claim 15 wherein each R′OH is selected from the group consisting of a 3-hydroxyglutarate diester or a 2-hydroxysuccinate diester.

22. A process for producing a food product containing a complex linked ester fat mimetic compound, the process comprising
(a) reacting a complex alcohol of the formula R′OH, wherein R′ comprises one to three carbons to which are attached two to three carboxylate groups of the formula —(CO)—O—R″, where R″ is an aliphatic group having 1 to 30 carbons, the R″ groups being the same or different, with a dibasic acid of the formula R(COOH)$_2$, where R is an aliphatic group having 1 to 6 carbons, or an anhydride of said acid, to form an intermediate ester compound of the formula R′O—(CO)—R—COOH;
(b) reacting said intermediate ester compound with a diglyceride comprising two ester groups of the formula —O—(CO)—R″, with R″ as defined above;
(c) isolating the linked ester product thereby produced; and
(d) incorporating the linked ester product in a food product.

23. A process according to claim 22 wherein said alcohol is reacted with a dibasic acid anhydride to form said intermediate ester compound.

24. A process according to claim 22 wherein said intermediate ester compound is reacted with thionyl chloride prior to reacting with a diglyceride.

25. A process according to claim 21 wherein said diglyceride comprises a 1,3-diglyceride.

26. A process according to claim 22 wherein said dibasic acid is selected from the group consisting of malonic, succinic, glutaric, adipic, maleic, fumaric, citraconic, mesaconic, sebacic, suberic, and diglycolic acids.

27. A process according to claim 22 wherein R′OH is selected from the group consisting of a 3-hydroxyglutarate diester or a 2-hydroxysuccinate diester.

28. A process for producing a food product containing a fat mimetic compound of the following formula:

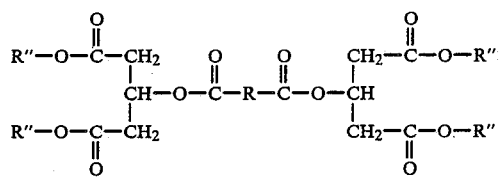

where
R is an aliphatic group having 1 to 6 carbons and the various R″ groups being the same or different, comprising
(a) reacting an alcohol of the formula

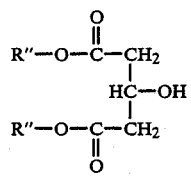

with an acid chloride of the formula

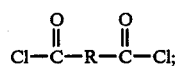

(b) heating and agitating until the reaction is substantially complete;
(c) recovering the complex linked ester product thereby produced; and
(d) incorporating the complex linked ester product in a food product.

29. A process for producing a food product containing a fat mimetic compound of the following formula:

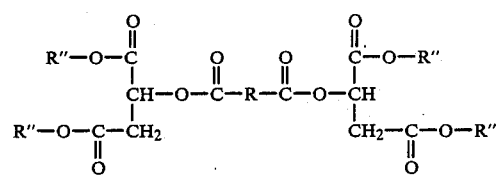

where
R is an aliphatic group having 1 to 6 carbons and
R″ is an aliphatic group having 1 to 30 carbons, the various R″ groups being the same or different, comprising
(a) reacting an alcohol of the formula

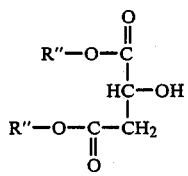

with an acid chloride of the formula

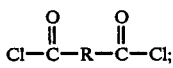

(b) heating and agitating until the reaction is substantially complete;
  (c) recovering the complex linked ester product thereby produced; and
  (d) incorporating the complex linked ester product in a food product.

30. A process for producing a food product containing a fat mimetic compound of the following formula:

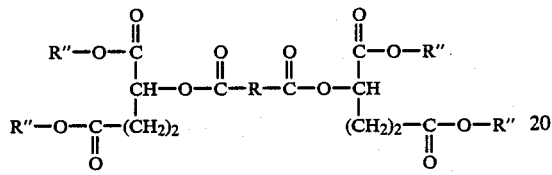

where
  R is an aliphatic group having 1 to 6 carbons and
  R″ is an aliphatic group having 1 to 30 carbons,
  the various R″ groups being the same or different,
comprising
  (a) reacting an alcohol of the formula

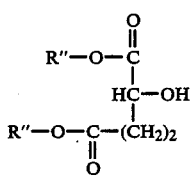

with an acid chloride of the formula

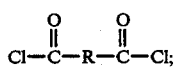

(b) heating and agitating until the reaction is substantially complete;
  (c) recovering the complex linked ester product thereby produced; and
  (d) incorporating the complex linked ester product in a food product.

31. A process for producing a food product containing a fat mimetic compound of the following formula:

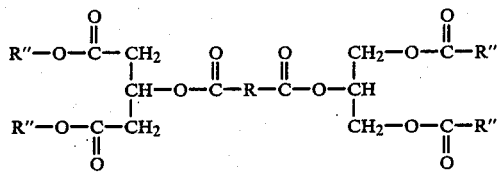

where
  R is an aliphatic group having 1 to 6 carbons and
  R″ is an aliphatic group having 1 to 30 carbons,
  the various R″ groups being the same or different,
comprising
  (a) reacting an alcohol of the formula

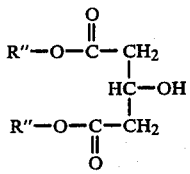

with an acid anhydride of the formula

to form an intermediate ester/acid compound of the formula

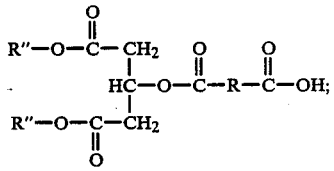

(b) reacting said intermediate ester/acid compound with thionyl chloride to form a chloride derivative;
  (c) reacting said ester/acid chloride with an alcohol of the formula

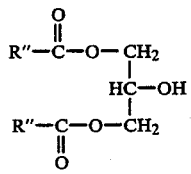

(d) warming and stirring until the reaction is substantially complete;
  (e) recovering the complex linked ester product thereby produced; and
  (f) incorporating the complex linked ester product in a food product.

32. A process according to any of claims 17, 22, 28, 29, 30 or 31, wherein R has 2 to 4 carbons.

33. A process according to any of claims 15, 22, 28, 29, 30, or 31, wherein R″ has 8 to 22 carbons.

34. A process according to any of claims 15, 22, 28, 29, 30 or 31, wherein R″ has 14 to 18 carbons.

35. A process according to any of claims 15, 22, 28, 29, 30 or 31, wherein the R″ groups are derived from fatty acids selected from the group consisting of caprylic, capric, lauric, myristic, myristoleic, palmitic, palmitoleic, oleic, stearic, ricinoleic, eleostearic linoleic, linolenic, arachidic, eicosapentaenoic, behenic, and erucic acids, and their alcohol counterparts.

36. A process according to any of claims 15, 22, 28, 29, 30, or 31, wherein R″ is derived from oils selected from the group consisting of soybean, cottonseed, coconut, palm kernel, babassu, corn, olive, palm, peanut, safflower seed, rapeseed, sesame seed, and sunflower seed oils.

37. A process according to any of claims 15, 22, 28, 29, 30, or 31, wherein R″ is derived from tallow or lard.

38. A process according to any of claims 15, 22, 28, 29, 30, or 31, wherein the reactions are conducted under vacuum.

* * * * *